("(12) United States Patent" block)

United States Patent
Park et al.

(10) Patent No.: US 10,540,647 B2
(45) Date of Patent: Jan. 21, 2020

(54) METHOD AND APPARATUS FOR PERFORMING PAYMENT FUNCTION IN LIMITED STATE

(71) Applicant: Samsung Electronics Co., Ltd., Gyeonggi-do (KR)

(72) Inventors: Yong Man Park, Gyeonggi-do (KR); Han Na Kim, Gyeonggi-do (KR); Mi Yeon Park, Gyeonggi-do (KR); You Bi Seo, Seoul (KR); Hwa Youn Suh, Seoul (KR); Sae Ah Oh, Seoul (KR); Byung In Yu, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 16/281,633

(22) Filed: Feb. 21, 2019

(65) Prior Publication Data

US 2019/0188675 A1 Jun. 20, 2019

Related U.S. Application Data

(63) Continuation of application No. 15/041,365, filed on Feb. 11, 2016, now Pat. No. 10,402,811.

(30) Foreign Application Priority Data

Feb. 12, 2015 (KR) .................. 10-2015-0021809

(51) Int. Cl.
*G06Q 20/32* (2012.01)
*G06F 3/0488* (2013.01)
(Continued)

(52) U.S. Cl.
CPC ......... *G06Q 20/32* (2013.01); *G06F 3/04883* (2013.01); *G06F 3/04886* (2013.01);
(Continued)

(58) Field of Classification Search
CPC .. G06Q 20/32; G06Q 20/401; G06Q 20/3223; G06Q 20/3274; G06F 21/00; G06F 3/04883; G06F 3/04886
See application file for complete search history.

(56) References Cited

U.S. PATENT DOCUMENTS 8,046,721 B2 * 10/2011 Chaudhri ............ G06F 3/04883
715/863
8,052,052 B1 11/2011 Power
(Continued)

FOREIGN PATENT DOCUMENTS

CN 102981754 A 3/2013
CN 103488416 A 1/2014
(Continued)

OTHER PUBLICATIONS

Chinese Search Report dated Jan. 31, 2019.
(Continued)

*Primary Examiner* — Nitin Patel
*Assistant Examiner* — Amy Onyekaba
(74) *Attorney, Agent, or Firm* — Cha & Reiter, LLC

(57) ABSTRACT

A user terminal supporting mobile payment service is provided. The user terminal includes a display, a memory in which a payment application is stored, and a processor configured to run the payment application. If at least one specified user input occurs on the display while in a locked state, the processor runs the payment application without unlocking the locked state. Thus the payment application may be quickly launched from the locked state.

21 Claims, 8 Drawing Sheets

US 10,540,647 B2
Page 2

(51) Int. Cl.
*G06F 21/00* (2013.01)
*G06F 21/32* (2013.01)
*G06Q 20/40* (2012.01)

(52) U.S. Cl.
CPC ............ *G06F 21/00* (2013.01); *G06F 21/32* (2013.01); *G06Q 20/3223* (2013.01); *G06Q 20/3274* (2013.01); *G06Q 20/401* (2013.01)

(56) References Cited

U.S. PATENT DOCUMENTS

| | | | |
|---|---|---|---|
| 8,136,053 B1 | 3/2012 | Miller et al. | |
| 8,581,877 B2 | 11/2013 | Yoo | |
| 8,750,901 B1* | 6/2014 | Gupta | G06Q 20/3223 455/456.1 |
| 8,850,560 B2 | 9/2014 | Kim et al. | |
| 8,872,796 B2 | 10/2014 | Yoo | |
| 9,137,669 B2 | 9/2015 | Kim et al. | |
| 9,152,209 B2* | 10/2015 | Jeong | G06F 1/3228 |
| 9,262,605 B2 | 2/2016 | Kim et al. | |
| 9,483,758 B2 | 11/2016 | Rhee et al. | |
| 9,710,139 B2 | 7/2017 | Yoo | |
| 2008/0168290 A1 | 7/2008 | Jobs et al. | |
| 2008/0192019 A1 | 8/2008 | Lee et al. | |
| 2010/0001967 A1 | 1/2010 | Yoo | |
| 2011/0078771 A1* | 3/2011 | Griffin | G06F 21/32 726/5 |
| 2011/0117970 A1 | 5/2011 | Choi | |
| 2011/0251954 A1 | 10/2011 | Chin | |
| 2011/0256848 A1 | 10/2011 | Bok et al. | |
| 2011/0282785 A1 | 11/2011 | Chin | |
| 2011/0283241 A1* | 11/2011 | Miller | G06F 3/04883 715/863 |
| 2011/0300831 A1 | 12/2011 | Chin | |
| 2012/0060128 A1 | 3/2012 | Miller et al. | |
| 2012/0081282 A1 | 4/2012 | Chin | |
| 2012/0176305 A1 | 7/2012 | Ryu et al. | |
| 2012/0284789 A1* | 11/2012 | Kim | F06F 1/1694 726/19 |
| 2013/0060687 A1 | 3/2013 | Bak et al. | |
| 2013/0065648 A1 | 3/2013 | Kim et al. | |
| 2013/0069962 A1 | 3/2013 | Nealer et al. | |
| 2013/0082945 A1 | 4/2013 | Jo | |
| 2013/0093707 A1 | 4/2013 | Park et al. | |
| 2013/0157561 A1 | 6/2013 | Tamai et al. | |
| 2013/0191789 A1* | 7/2013 | Calman | G06F 3/017 715/863 |
| 2013/0326395 A1 | 12/2013 | Oh et al. | |
| 2013/0332228 A1 | 12/2013 | Lim et al. | |
| 2013/0332354 A1 | 12/2013 | Rhee et al. | |
| 2014/0006285 A1 | 1/2014 | Chi et al. | |
| 2014/0058860 A1* | 2/2014 | Roh | G06Q 20/204 705/17 |
| 2014/0058941 A1* | 2/2014 | Moon | G06Q 20/322 705/42 |
| 2014/0066131 A1 | 3/2014 | Yoo | |
| 2014/0081870 A1* | 3/2014 | de Sylva | G06Q 20/40145 705/44 |
| 2014/0094224 A1* | 4/2014 | Lozovoy | H04M 1/22 455/566 |
| 2014/0101737 A1* | 4/2014 | Rhee | G06F 21/32 726/6 |
| 2014/0137234 A1 | 5/2014 | Chin | |
| 2014/0162598 A1* | 6/2014 | Villa-Real | H04M 1/66 455/411 |
| 2014/0195968 A1* | 7/2014 | Banavara | G06Q 30/0641 715/810 |
| 2014/0263624 A1* | 9/2014 | Guillaud | G06K 5/00 235/380 |
| 2014/0269946 A1 | 9/2014 | Wallner | |
| 2014/0279437 A1 | 9/2014 | Lee et al. | |
| 2014/0310643 A1 | 10/2014 | Karamanenko et al. | |
| 2014/0344151 A1 | 11/2014 | Soundararajan | |
| 2014/0364054 A1 | 12/2014 | Kim et al. | |
| 2015/0020030 A1 | 1/2015 | Yoo | |
| 2015/0106218 A1 | 4/2015 | Moon et al. | |
| 2015/0111558 A1* | 4/2015 | Yang | G04G 21/04 455/418 |
| 2015/0134513 A1* | 5/2015 | Olson | G06K 19/06206 705/39 |
| 2015/0170210 A1 | 6/2015 | Rhee et al. | |
| 2015/0195789 A1 | 7/2015 | Yoon et al. | |
| 2015/0227913 A1* | 8/2015 | Ballout | G06Q 20/3223 705/42 |
| 2015/0227925 A1* | 8/2015 | Filler | G06Q 20/3223 382/100 |
| 2015/0311574 A1 | 11/2015 | Kim et al. | |
| 2015/0346994 A1* | 12/2015 | Chanyontpatanakul | G06F 3/04883 715/828 |
| 2015/0381798 A1 | 12/2015 | Yoon et al. | |
| 2016/0026425 A1 | 1/2016 | Lee et al. | |
| 2016/0042356 A1* | 2/2016 | Jakobson | G06Q 20/40145 705/21 |
| 2016/0366273 A1 | 12/2016 | Kobayashi | |
| 2017/0039548 A1 | 2/2017 | Rhee et al. | |
| 2017/0076560 A1* | 3/2017 | Dasilva | G06Q 10/06 |
| 2017/0148010 A1* | 5/2017 | Bak | G06Q 20/20 |
| 2018/0341344 A1* | 11/2018 | Foss | G06F 1/163 |

FOREIGN PATENT DOCUMENTS

| | | |
|---|---|---|
| CN | 103516891 A | 1/2014 |
| CN | 103593128 A | 2/2014 |
| CN | 103632266 A | 3/2014 |
| EP | 2 144 148 A2 | 1/2010 |
| EP | 2 680 204 A2 | 1/2014 |
| KR | 10-2012-0080072 A | 7/2012 |
| KR | 10-2012-0125086 A | 11/2012 |
| KR | 10-2013-0005789 A | 1/2013 |
| KR | 10-2013-0013714 A | 2/2013 |
| KR | 10-2013-0039586 A | 4/2013 |
| KR | 10-2013-0138659 A | 12/2013 |
| KR | 10-2014-0025680 A | 3/2014 |
| KR | 10-2014-0075730 A | 6/2014 |
| KR | 10-2014-0102937 A | 8/2014 |

OTHER PUBLICATIONS

Australian Search Report dated Feb. 6, 2019.
Chinese Search Report dated Jul. 8, 2019.
Korean Search Report dated Nov. 25, 2019.

* cited by examiner

METHOD AND APPARATUS FOR PERFORMING PAYMENT FUNCTION IN LIMITED STATE

CROSS REFERENCE TO RELATED APPLICATIONS

This application is a Continuation of U.S. patent application Ser. No. 15/041,365 filed on Feb. 11, 2016 which claims the benefit under 35 U.S.C. § 119(a) of a Korean patent application filed on Feb. 12, 2015 in the Korean Intellectual Property Office and assigned Serial number 10-2015-0021809, the entire disclosure of which is hereby incorporated by reference.

TECHNICAL FIELD

The present disclosure relates to a technology for performing a payment function in an electronic device.

BACKGROUND

Electronic devices such as smartphones provide various convenient and useful functions through various applications. For example, a user may pay for a product using a credit card application (also referred to as a program or "app") installed in a smartphone. When purchasing a product in a store, the user may, in sequence, take out a smartphone, turn on its screen, unlock a lock screen, and select a payment app icon to thereby execute the payment app. The user may then allow a point of sale (POS) terminal to recognize a barcode of a virtual card displayed on the smartphone, or allow the smartphone to transmit a signal to the terminal through near field communication (NFC) so as to pay for the product.

However, a payment method based on a mobile terminal may be complicated compared to the traditional approach of just presenting a physical credit card of the like. That is, for the purpose of payment using one's smartphone as noted above, the user pushes a button to turn on its screen, inputs a password or a pattern through fingerprint recognition, locates and launches the payment app icon, etc. Even if the user is currently using the mobile terminal, the user typically terminates a currently used application and executes the payment application, or outputs the payment application to a display using an application switching function through a button input.

SUMMARY

Accordingly, an aspect of the present disclosure is to provide a technology for simplifying a method of executing a specific application such as a payment application in a mobile terminal and preventing misoperation and waste of power related to execution of an application.

In accordance with an aspect of the present disclosure, a user terminal supporting mobile payment service is provided. The user terminal includes a display, a memory in which a payment application is stored, and a processor configured to run the payment application. If at least one specified user input occurs on the display while the user terminal is in a locked state, the processor runs the payment application without unlocking the locked state.

DETAILED DESCRIPTION

Figure 1:
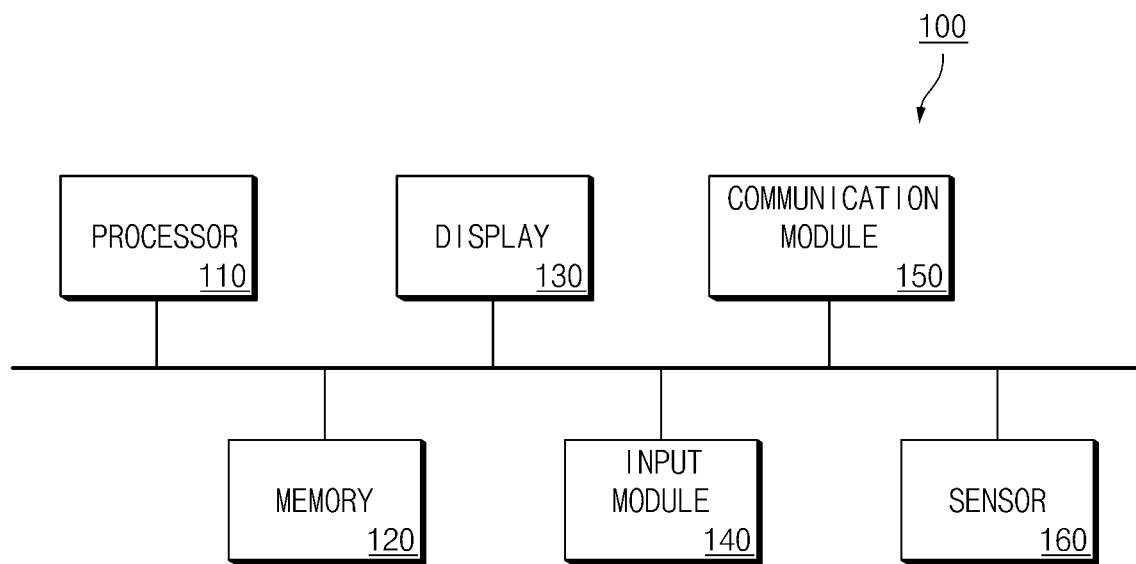
FIG. 1 illustrates an exemplary configuration of a user terminal according to an embodiment of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure. Regarding description of the drawings, like reference numerals may refer to like elements.

The terminology used herein is not for delimiting the present disclosure but for describing specific various embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

Hereinafter, an electronic device according to various embodiments of the present disclosure will be described with reference to the accompanying drawings.

FIG. 1 illustrates an exemplary configuration of a user terminal, 100, according to an embodiment of the present disclosure. User terminal 100 may include a processor 110, a memory 120, a display 130, an input module 140, a communication module 150, and a sensor 160. The configuration of the user terminal illustrated in FIG. 1 is merely an example. Therefore, appropriate elements (e.g., hardware or software modules) for implementing various embodiments of the present disclosure may be added, or some of the elements illustrated in FIG. 1 may be omitted. For example, a vibration module (e.g., a vibrator) for providing a vibration-type user feedback may be added to the user terminal 100. An electronic device to which various embodiments of the present disclosure are applicable is described below based on the user terminal 100 illustrated in FIG. 1.

The user terminal 100 described herein may correspond to an electronic device supporting a specific function (e.g., a payment function), such as a smartphone, a tablet, a smartwatch, or the like. However, the user terminal 100 is not limited to the foregoing examples, and may correspond to various types of electronic devices supporting the specific function.

Furthermore, the user terminal 100 may provide various applications or functions. In an embodiment of the present disclosure, the user terminal 100 may execute a specific application or function according to a specified input in a locked state or a screen-off state. For convenience of description, it is assumed herein that the specific application or function is a payment application. Herein, a state in which the payment application is run may represent a state in which payment may be immediately performed in association with a payment device of a store, such as a POS terminal. For example, the state in which the payment application is run may correspond to a state in which a barcode of a specific virtual card is displayed, or a state in which an NFC or magnetic secure/signal transmission (MST) signal for payment is transmittable.

The processor 110 may control various elements constituting the user terminal 100. The processor 110 may execute instructions stored in the memory 120. For example, the processor 110 may execute a payment application stored in the memory 120 and may perform payment according to a user input.

The memory 120 may store various instructions (or program codes) for implementing various embodiments of the present disclosure including the payment application.

The display 130 may output a result of an operation performed by the processor 110. If an input to a specified button occurs or a user input does not occur for a certain time, the display 130 may enter a screen-off state. In this case, the display 130 may be switched to a screen-on state by a re-input to the specified button or any other input for driving the display 130. If the display 130 enters the screen-on state, the display 130 may output a screen (e.g., a lock screen) corresponding to a locked state in which most of functions are restricted and only some of the functions (e.g., emergency call, camera, etc.) are accessible. Upon receiving an appropriate input for unlocking the locked state through the input module 140, the user terminal 100 may unlock the locked state and may output a home screen.

The display 130 may be connected to a touch integrated circuit (IC) for receiving a touch input while outputting content. That is, the display 130 may include a touch panel, which may be connected to the touch IC. In detail, the display 130 may include a layer (e.g., a TFT-LCD, LED, or AMOLED layer or the like) for outputting content and a layer corresponding to the touch panel, and may output content through the layer for outputting content and may receive a user's touch input (or hovering input) through the layer corresponding to the touch panel. In this case, the display 130 may be construed as performing a part of functions of the input module 140.

The screen-off state of the display 130 may correspond to a state in which power supply to the layer for outputting content is completely cut off. In an embodiment of the present disclosure, the user terminal 100 may continuously maintain power supply to the touch panel or may allow the touch panel to sense a touch input periodically, in order to recognize a user input in the screen-off state. This operation will be described in detail later with reference to FIG. 3.

The input module 140 may correspond to an input means for receiving various inputs to the user terminal 100. For example, the input module 140 may include a structure for receiving a button input or a key input and a microphone for receiving a voice input, in addition to a touch module driven with the above-mentioned touch panel and touch IC.

The communication module 150 may establish a connection between the user terminal 100 and an external terminal or network (e.g., a base station or a server). Furthermore, the communication module 150 may transmit at least one of an NFC signal or an MST signal for payment. In an embodiment of the present disclosure, the processor 110 may allow the communication module 150 to transmit the NFC signal or the MST signal automatically if the payment application is run on the display 130.

The sensor 160 may correspond to at least one sensor for sensing a peripheral environment of the user terminal 100 or a state of a user of the user terminal 100. For example, the sensor 160 may include an illumination sensor for sensing ambient illumination of the user terminal 100 or a proximity sensor for determining whether another object approaches within a certain distance from the user terminal 100. Furthermore, the sensor 160 may include a biometric sensor for obtaining fingerprint information or biometric information such as iris or heart rate information from the user for the purpose of user authentication.

Described below with reference to FIGS. 2 to 8 are various embodiments in which the payment application is run (which may also referred to as being launched or initiated) in the user terminal 100 which is in a predetermined state (e.g., a locked state, a screen-off state, a home screen state, etc.).

Figure 2:
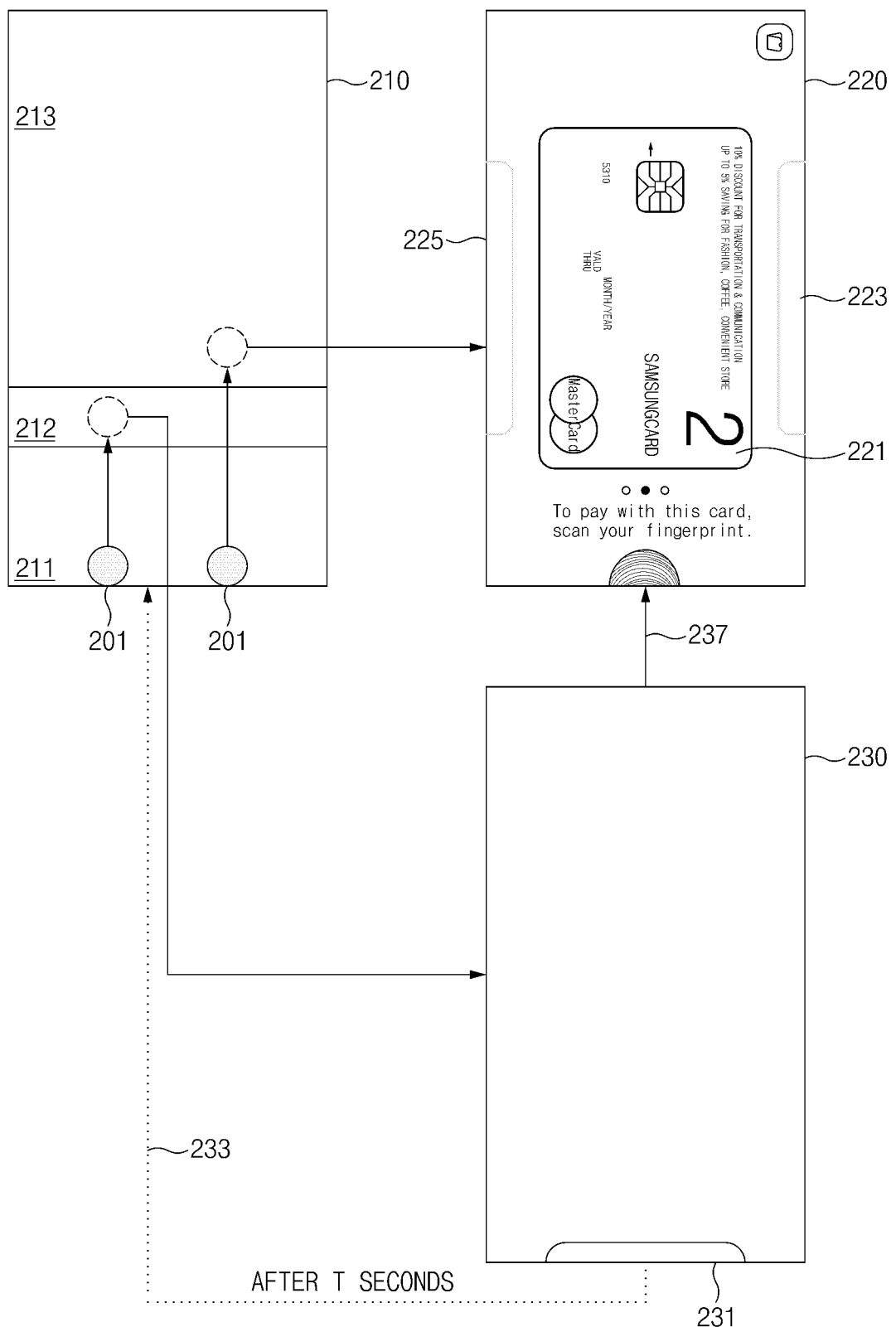
FIG. 2 illustrates an exemplary execution screen of a payment application according to an embodiment of the present disclosure.

FIG. 2 illustrates an exemplary execution screen of the payment application according to an embodiment of the present disclosure. A screen 210 may correspond to a screen of the display 130 which is in the locked state or the screen-off state. (Screen 210 is illustrated in FIG. 2 in the screen-off state but the operations of FIG. 2 may also be applied to the case of a locked state for screen 210 in which a background image and optionally a screen unlock prompt are displayed.) In this state, if a specified user input (e.g., a swipe input) that occurs on a specific region of the screen 210 passes through a specified threshold point and arrives/optionally ends within a specific "threshold region", the payment application may be run and the screen 210 may transition to a payment application execution screen 220.

In detail, the screen 210 may be divided into a plurality of regions (e.g., the regions being defined by the processor 110.) For example, the screen 210 may be divided into a first region 211, a second region 212, and a third region 213 with respect to the bottom of the screen. In this example, the second region 212 is in between the first and third regions 211, 213, and the three regions 211, 212 and 213 are contiguous. Here, if a user input 201 begins at one point of the first region 211 ends at the third region 213 after passing through the second region 212, the screen 220 may be output. In this case, the user terminal 100 may output the screen 220 while effectively maintaining the state prior to the occurrence of the user input 201. For example, in the case where the user terminal 100 is in the locked state, the locked state may otherwise be maintained (i.e., except for running the payment application) even when the screen 220 is displayed. That is, the user may be unable to access other applications from the screen 220 without first performing an unlocking input which may also include a password input if the device is in a password protected mode as well. In the case where the user terminal is in the screen-off state, the user terminal 100 may run the payment application without a background in the screen 220 or may return to the screen-off state if the payment application is terminated. (The screen-off state may also be considered a locked state of the user terminal 100.)

If the user input 201 that occurs on the first region 211 arrives at the second region 212 but ends in the second region 212 without entering the third region 213, the user terminal 100 may still determine that the user intends to execute the payment application and in this case may output guide information 231 to a portion of the first region 211 as illustrated in a screen 230. In other words, in the case where the user input 201 fails to arrive at a position beyond a threshold point (e.g., to within the third region 213), the user terminal 100 may provide a visual clue or a hint image for determining whether an input for running the payment application has occurred. Here, the guide information 231, which is an item for running the payment application, may be, for example, a part of a card shape. However, the guide information is not limited to the above-mentioned example, and may be provided to various regions in various forms.

In an alternative approach, if the user input 201 ends (e.g., at the second region 212) without arriving at the third region 213 in the case where the user terminal 100 is in the screen-off state, the user terminal 100 may call a home screen without displaying additional information (e.g., outputting a payment application or payment means). In still another alternative, the user terminal 100 may return to the screen-off state without providing the guide information and without outputting a home screen. In this case, a feedback such as a vibration may be provided.

In the case of displaying guide information as in screen 230, if another user input does not occur until a certain time (e.g., T seconds) elapses since provision of the guide information, the user terminal 100 may allow an item output to the screen 230 to disappear and may return to the state prior to the occurrence of the user input (as indicated by path 233). In other words, if the user terminal 100 was in the locked state before the occurrence of the user input 201, the user terminal 100 may switch a screen back to the screen 210 of the locked state, or, if the user terminal 100 was in the screen-off state before the occurrence of the user input 201, the user terminal 100 may remove all the items output to the display 130 and may turn the screen off.

If another specified (e.g., predefined) user input additionally occurs at a point on the guide information 231 while the guide information 231 is output to the screen 230, the user terminal 100 may run the payment application so that the screen 220 is output, as indicated by path 237. For example, if an item (e.g., the guide information 231) for running the payment application is displayed at the bottom of the screen 230 and another user input that starts from the item and ends at the third region 213 occurs, the user terminal 100 may run the payment application so that the screen 220 is output.

In the case where a specified user input, e.g., the drag from touch region 211 to 212 or 213, occurs in the locked state or the screen-off state, it may be difficult for the user to recognize whether an intended input has been properly performed, particularly in the screen-off state. In an embodiment of the present disclosure, if at least a part of a specified user input occurs, the user terminal 100 may provide feedback indicating occurrence of the specified user input. For example, if an input, which starts from the first region 211 towards the third region 213, arrives at the second region 212, the user terminal 100 may generate a vibration, may allow an LED lamp installed in the user terminal 100 to flicker, or may provide a specific sound or voice guide. In this case, an intensity of the vibration, a level of the sound, or a period of LED lamp flickering may vary with a position of the user input 201. For example, a feedback intensity may be gradually increased as the user input 201 moves from a position near the first region 211 to a position near the third region 213.

In the case where the user terminal 100 is in the screen-off state, the processor 110 may be in a sleep state. If the user input 201 arrives at the second region 212, the user terminal 100 may wake up the processor 110 (e.g., an application processor (AP)), and then may provide a specific feedback. For example, the user terminal 100 may provide a vibration feedback by controlling a vibration module (e.g., a vibrator). In an embodiment of the present disclosure, in the case where the user terminal 100 includes a sensor hub, or a part of a control function of the processor 110 is assigned to a separate processor (e.g., a communication processor (CP)), the user terminal 100 may provide a feedback such as a vibration, LED flickering, a sound, or the like without waking up the processor 110.

In addition, if the user input 201 starts from the first region 211 but ends within the first region 211, the user terminal 100 may maintain the state of the screen 210 without running the payment application or providing the guide information.

FIG. 2 illustrates the example in which a screen is divided into three regions, and the payment application is run in response to an input moving in a direction from the bottom of the screen to the top of the screen (or from the first region 211 to the third region 213). However, a user input specified for performing a specific application/function may be variously modified. For example, a user input moving from the top to the bottom, a user input moving in a diagonal direction, or a user input for performing a specific function using a double tap, a triple tap, or a multi-touch may be configured in various forms. Furthermore, a region (e.g., the region 211) for recognizing an input start, a region (e.g., the region 212) serving as a reference for providing guide information/feedback, and a "threshold region" (e.g., the region 213) for performing a function may also have various sizes, locations or shapes as alternatives to those of the example of FIG. 2. For example, the first to third regions may correspond to predetermined regions in a center of the screen of the user terminal 100. In an embodiment of the present disclosure, the guide information or feedback may not be provided.

In various embodiments of the present disclosure, if a relatively simple user input is specified for launching the payment application, it may be easier to launch, but a probability of misoperation (i.e., erroneous or unintentional operation) may be higher as compared to a more complex specified user input. For example, the user may unintentionally perform dragging on the screen of the user terminal 100 in his or her pocket, whereby the payment application may be unintentionally executed. Such misoperation may cause unnecessary power consumption.

Therefore, the user terminal 100 may determine whether misoperation occurs using a sensor installed therein. For example, the user terminal 100 equipped with an illumination sensor may run the payment application if a sensed ambient brightness is equal to or higher than a specified level. If the sensed brightness is lower than the specified level, the user terminal 100 may determine that the user terminal 100 is currently placed in an environment such as a pocket, a bag, or a dark place in which a probability of running the payment application is low, and may thus not run the payment application even if the above-mentioned specified input is sensed.

In another example, the user terminal 100 equipped with a proximity sensor may determine whether another object is sensed within a specified distance from the user terminal 100. If any object is sensed within a specified distance (e.g., 2 cm) from the user terminal 100, the user terminal 100 may determine that the user terminal 100 is currently contained in a pocket or a bag or covered by a case/cover or is in any other situation in which performing payment is not appropriate, and may thus not run the payment application even if the above-mentioned specified input occurs.

In still another example, the user terminal 100 may run the payment application based on a combination of information obtained through the illumination sensor and the proximity sensor (e.g., if both the conditions are satisfied), or may provide a notification popup for requesting confirmation from the user before running the payment application.

As illustrated in the screen 220, if the payment application is run in the locked state or the screen-off state, a predefined payment means such as a virtual credit card presenting an image of the user's credit card, may be output as a main payment means 221 to the screen. The main payment means 221 may be an image of a primarily used card (or a barcode thereof) preselected by the user. In various embodiments of the present disclosure, the main payment means 221 may be determined in various ways. For example, a card most recently used for payment or a card most frequently selected for payment may be determined as the main payment means 221. Furthermore, the user terminal 100 may output, to the screen, an authentication means to be used for payment together with the payment means. Although FIG. 2 illustrates that a fingerprint recognition means for recognizing a fingerprint of the user is output, a screen for receiving a password may be output instead of the fingerprint recognition means.

In general, the user may use various cards since different benefits are provided according to card companies or the types (or brands) of stores. Accordingly, payment means 223 and 225 distinct from the main payment means 221 may be output blurredly at the sides of the main payment means 221. The user may select a card to be used for payment by swiping a finger on a screen leftwards/rightwards so that the card choices correspondingly scroll.

In an embodiment of the present disclosure, the user terminal 100 may allow a desired payment means to be directly output based on a gesture input corresponding to a predefined payment means. (This operation will be described later in detail with reference to FIGS. 4 and 5.)

In an embodiment of the present disclosure, the state of the screen of display 130 may correspond to a state in which payment is enabled. For example, a barcode, an NFC payment signal, or an MST payment signal recognizable by a POS terminal of a store corresponding to the main payment means 223 may be transmitted. In an embodiment of the present disclosure, if the payment application is run, the user terminal 100 may repetitively transmit a corresponding NFC signal and MST signal while outputting a barcode to the screen 220.

The embodiments described with reference to FIG. 2 may be carried out in the user terminal 100 while it is in the locked state. Furthermore, the above-mentioned embodiments may be carried out in the same manner in an unlocked state of the user terminal 100, such as a state in which a home screen is output. However, in the case where the user terminal 100 is in the screen-off state, the above-mentioned embodiments may be varied according to a touch recognition method. This case is described below in detail with reference to FIG. 3.

Figure 3:
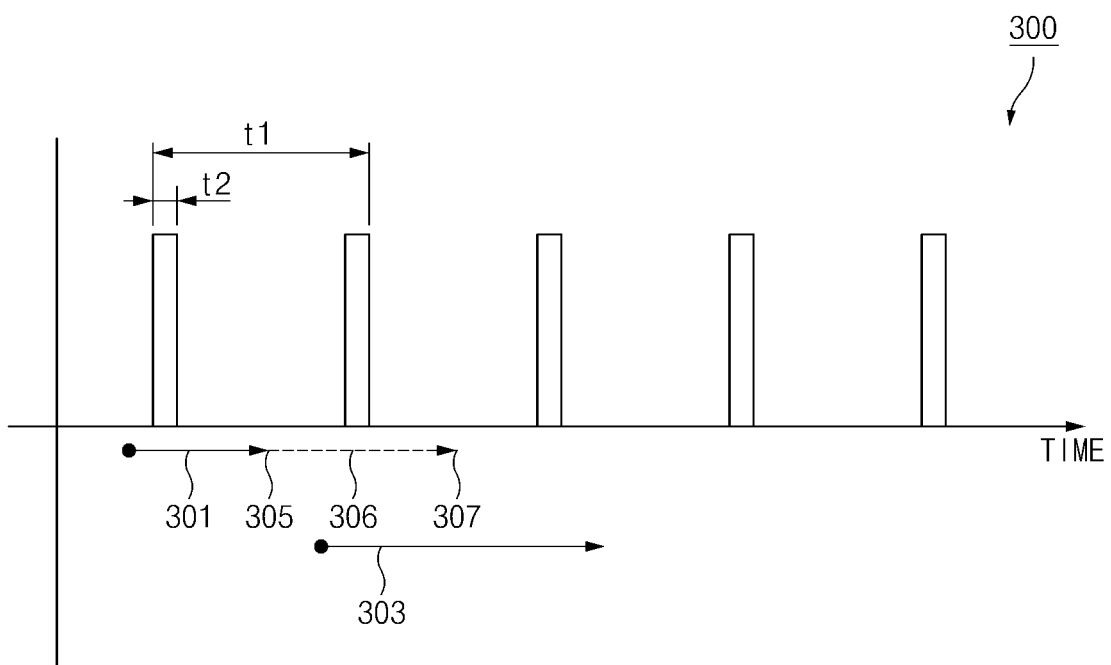
FIG. 3 illustrates an exemplary method for recognizing a touch when a display of a user terminal is turned off according to an embodiment of the present disclosure.

FIG. 3 illustrates an exemplary method for recognizing a touch for launching a payment application when a display of a user terminal is turned off according to an embodiment of the present disclosure. When the user terminal 100 enters the screen-off state, it may continue to sense a touch input through the display 130. In the case where such touch function is activated, the payment application may be run in the same manner as described above with reference to FIG. 2. In general, recognizing a touch input is performed with low power, but the user terminal 100 may periodically sense a touch input as illustrated in FIG. 3 in order to further reduce power consumption. The gesture illustrated by FIG. 3 to launch a payment application may be referred to as a "long touch plus drag" gesture.

For example, the user terminal 100 may recognize a touch input for a duration time t2 by driving the touch IC at a period of t1 longer than t2, where the duration t2 is designated for touch detection during each time period t1. For example, if a user input 301 to one (initial) point is sensed during one period but is not sensed in a next period (exemplified as touch no longer being sensed at the initial point at the time corresponding to the arrowhead 305), the user terminal 100 may determine that the input is a not part of an input for running the payment application. In this case, even if the user performs arbitrary dragging on the display 130 which is turned off, the payment application may not be executed (by design).

On the other hand, if the user input 301 is sensed in a certain period and is still sensed in a next period, as illustrated by the path 306 and arrowhead 307, or by the user input 303, the user terminal 100 may maintain sensing of a touch input. For example, when periodic touch sensing is enabled only for a certain region (e.g., the first region 211 of FIG. 2) in order to minimize power consumption, if an input (a first input) that occurs over multiple periods is sensed, the user terminal 100 may enable touch sensing for all regions and all time periods in order to sense a following input (a second input) for running the payment application using the first input as a trigger input. Here, if the second input (e.g., a dragging input that starts from the first region 211 and is ends at the third region 213) occurs, the user terminal 100 may run the payment application on the display 130. Thus, in the "long touch plus drag" gesture, the long touch may be considered the first input of the gesture and the drag may be considered the second input of the gesture.

In a system that doesn't employ the long touch plus drag gesture of FIG. 3, the user may run the payment application through a specified user input. However, in the case of the long touch plus drag, the user may run the payment application by firstly providing the first input for allowing initial sensing of a specified user input and then providing the second input (the drag) following the first input. Here, the first input may be maintained at least for a time corresponding to an operation period of a touch sensor (touch IC) for sensing a touch input or a time longer than the operation period. In practice, an operation period of touch sensing, i.e., the "long touch", may be relatively short (e.g., less than one second), and the user may maintain an input to a touch point for a short time and then may provide the same input as that for the locked state, so that the payment application may be run.

The embodiments described herein based on the locked state, the unlocked state, or the state in which a touch sensor continues to operate while a screen is turned off may be extended to an embodiment for the screen-off state by applying the additional input described above with reference to FIG. 3. That is, the long touch plus drag gesture may be employed as the specified user input to launch the payment application from the locked state, the unlocked state, or the screen-off state.

Figure 4:
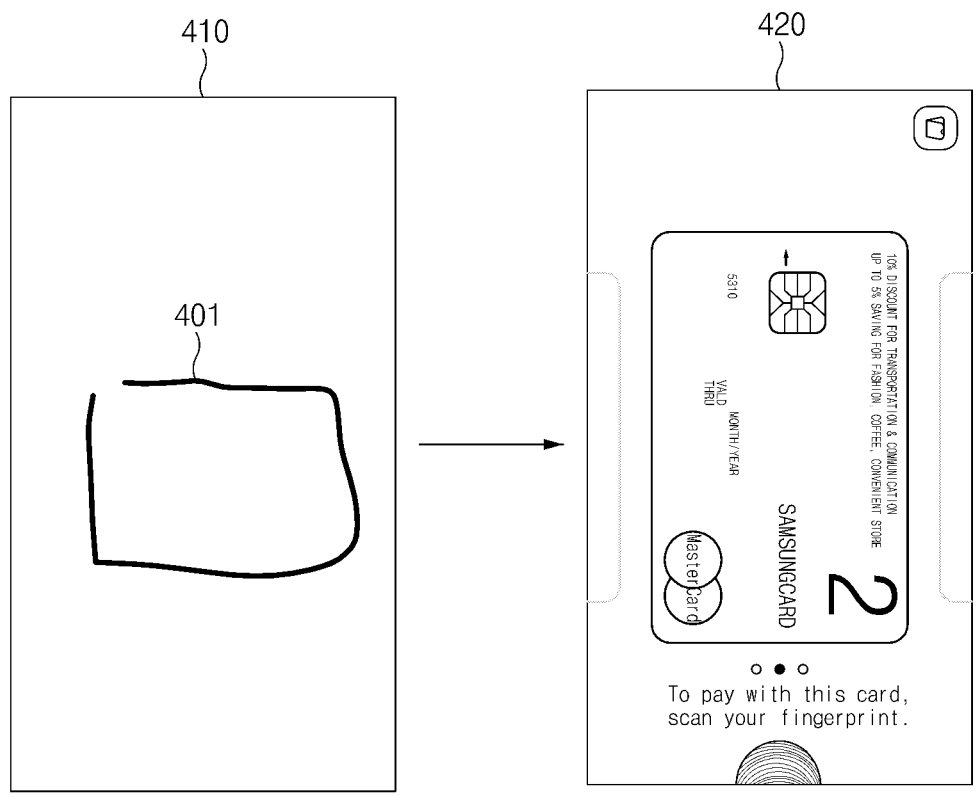
FIG. 4 illustrates an exemplary method for executing the payment application using a specified gesture according to an embodiment of the present disclosure.

FIG. 4 illustrates an exemplary method for executing the payment application using a specified gesture according to an embodiment of the present disclosure. In the method of FIG. 4, if a particular character or figure is drawn on a screen 410, the user terminal 100 may recognize the character or figure and may output a specific function of a specific application. For example, if an input shaped like a quadrangle, such as an input 401, is provided to the display 130 which is in the screen-off state or the locked state, the user terminal 100 may output a predefined credit card as a payment means as illustrated in a screen 420. The user terminal 100 may output an appropriate payment means based on matching information between a stored gesture input and a payment means stored in the memory 120. For example, if a figure shaped like the letter M is input, the user terminal 100 may output a card associated with MasterCard®, or, if a figure shaped like the letter V is input, the user terminal 100 may output a card associated with Visa® Card. Such matching information may be defined by a user input in a settings menu or the like. The user may assign gesture inputs respectively to a plurality of payment means types (e.g., a credit card, a check card, a membership card, a prepaid card, etc.), and, if a gesture input corresponding to a predefined payment means occurs, the user terminal 100 may run the payment application using the predefined payment means as a default payment means.

Figure 5:
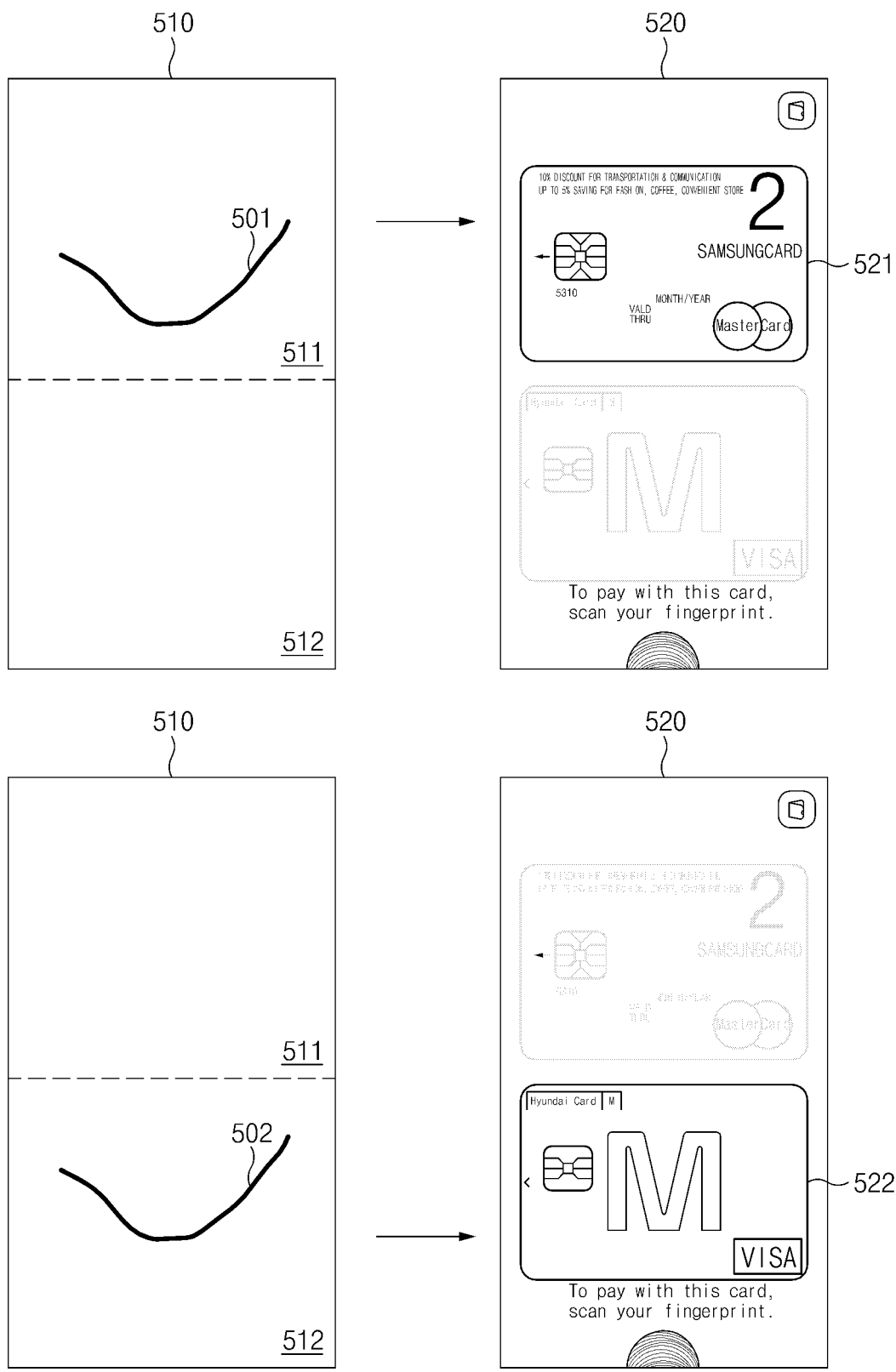
FIG. 5 illustrates an exemplary method for executing the payment application using a specified region and a specified gesture according to an embodiment of the present disclosure.

FIG. 5 illustrates an exemplary method for executing the payment application using a specified region and a specified gesture according to an embodiment of the present disclosure. In this method, the user terminal 100 may output different payment means based on regions where gesture inputs occur. For example, if a gesture input 501 occurs on an upper region 511 of a screen 510, a specified payment means 521 may be output to a corresponding region as illustrated in a screen 520. As illustrated in the lower part of FIG. 5, if a gesture input 502 occurs on a lower region 512, a specified payment means 522 may be output to a corresponding region. Here, the payment means 521 may differ from the payment means 522. Furthermore, as described above with reference to FIG. 4, the gesture input 501 or 502 may be varied so that other payment means may be output to the corresponding regions.

Although it has been described that the screen 520 corresponds to a state in which a payment means in the form of a virtual credit card is output in the embodiments of FIGS. 4 and 5, the state in which the screen 520 is output may be construed as a state in which a payment means in the form of a barcode image is output, or, an NFC or MST payment signal corresponding to the payment means is transmitted through the communication module 150 as described above with reference to FIG. 2.

Figure 6:
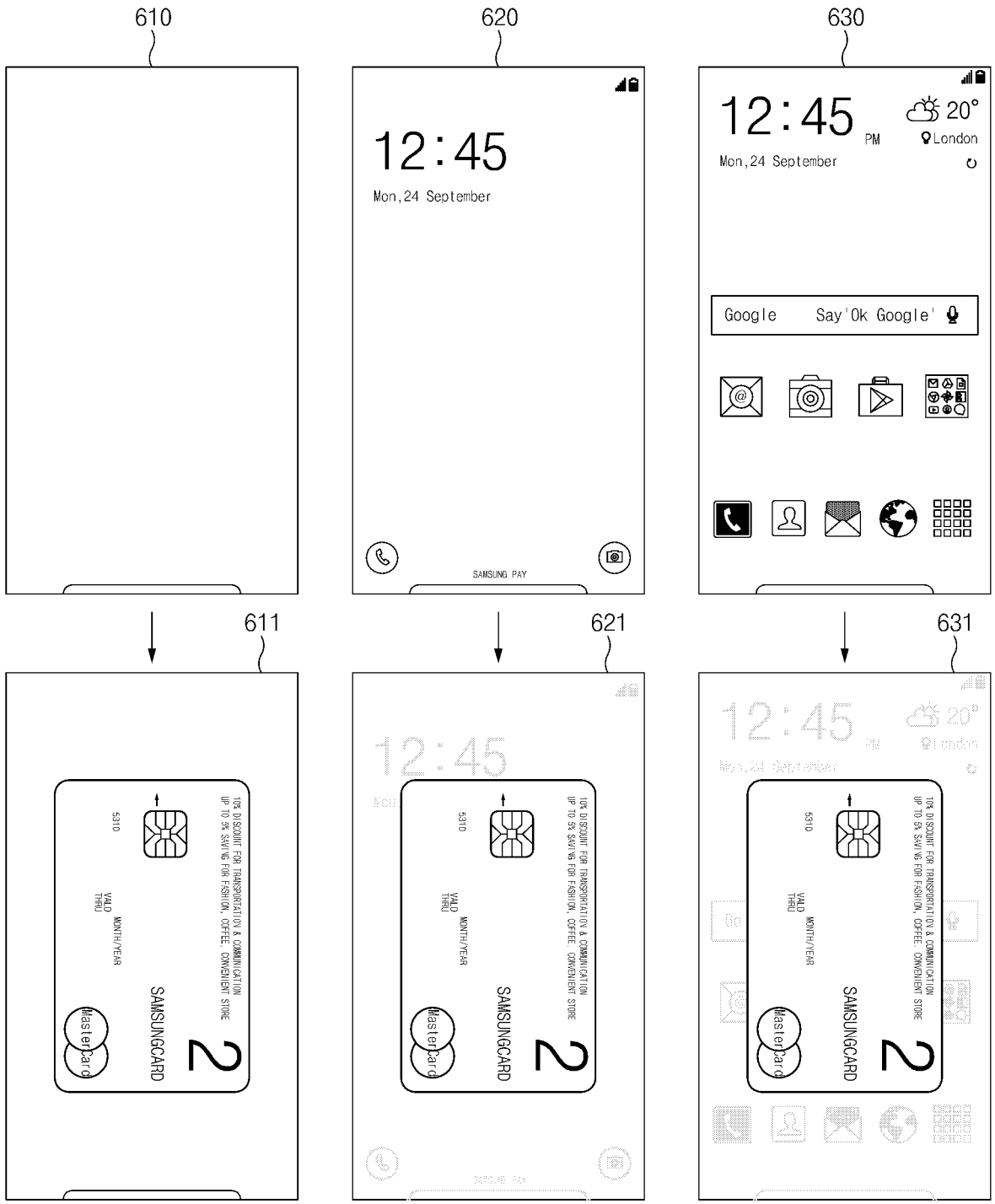
FIG. 6 illustrates an exemplary method for handling a background screen when the payment application is executed according to an embodiment of the present disclosure.

FIG. 6 illustrates an exemplary method for handling a background screen when the payment application is executed according to an embodiment of the present disclosure. In the method of FIG. 6, the user terminal 100 may run the payment application in the same or corresponding manners on a screen 610 of the screen-off state, a screen 620 of the locked state, and a screen 630 of the unlocked state. In this case, the user terminal 100 may provide an appropriate visual effect. For example, when running the payment application, the user terminal 100 may use, as a background, a screen displayed immediately before the payment application is run so as to give a sense of intuitiveness and simplicity. In other words, a black screen may be used as the background for the screen-off state, a lock screen may be used as the background for the locked state, and a corresponding screen such as a home screen or currently executed application screen may be used as the background for the unlocked state.

In detail, the user terminal 100 may apply a specified image effect to a lock screen output to the display which is in a certain state (e.g., the locked state). For example, the user terminal 100 may dim the screen 620, and then may apply a blur effect thereto. The image effect may be variously modified. For example, for a home screen, the user terminal 100 may apply the blur effect, may render background icons semitransparent, or may hide the background icons (so that only a background image is shown). Thereafter, the user terminal 100 may run the payment application so that the payment application is overlaid on a screen to which the image effect is applied. By applying such an image effect, the user terminal 100 may run the payment application as illustrated in a screen 611, a screen 621, and a screen 631 using, as backgrounds, the screen 610 of the screen-off state, the screen 620 of the locked state, and the screen 630 of the unlocked state, respectively.

Figure 7:
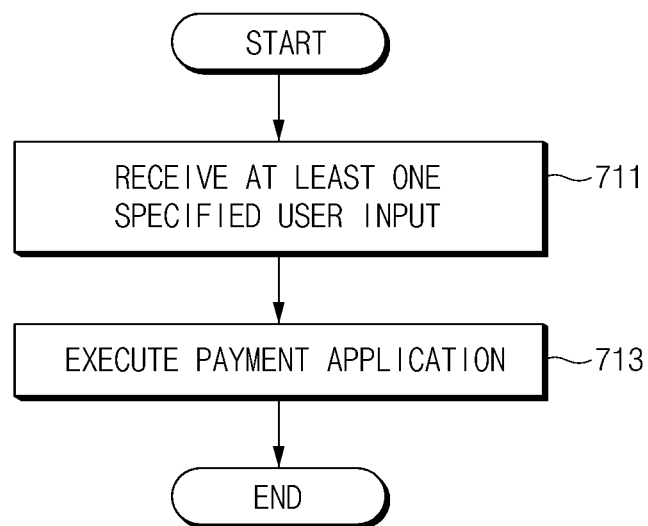
FIG. 7 illustrates an execution process of the payment application according to an embodiment of the present disclosure.

FIG. 7 illustrates an execution process of the payment application according to an embodiment of the present disclosure. The user terminal 100 may receive at least one specified user input in operation 711 while it is in a screen-off state, a locked state or an unlocked state. For instance, in the example of FIG. 2, the user terminal 100 may receive a first input (touch) occurring on the first region 211, a second input (dragging) for moving a position of the first input, and a third input (release) corresponding to release of a touched state. If a location of the occurrence of the third input (e.g., a location where the touched state is released) is in the third region 213, the user terminal 100 may run the payment application, but, if the location is in the second region 212, the user terminal 100 may output a guide item. If an additional input to the guide item, such as a fourth input, occurs, the user terminal 100 may run the payment application.

Briefly, the user terminal 100 may receive at least one of the above-mentioned user inputs as the at least one specified user input to the display 130 which is in the locked state or the screen-off state, and may run the payment application based on the received user input. An overall execution process related to the above-mentioned embodiment is described below with reference to FIG. 8.

Figure 8:
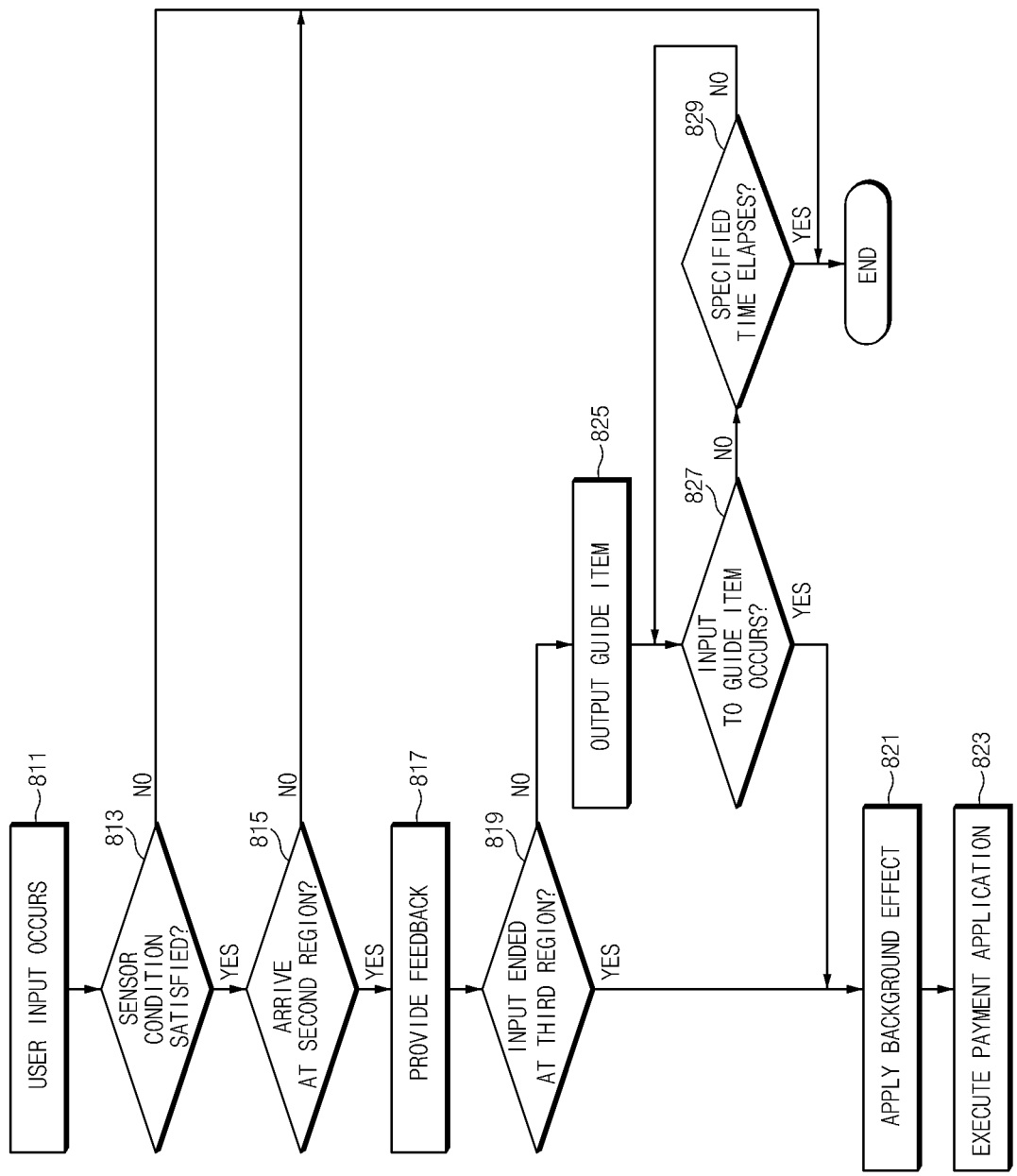
FIG. 8 illustrates an overall execution process of the payment application according to various embodiments of the present disclosure.

FIG. 8 illustrates an overall execution process of the payment application according to various embodiments of the present disclosure. The operations in FIG. 8 may be performed through the control of processor 110.

In operation 811, at least one specified input may occur on the display 130 of the user terminal 100 which is in a predetermined state such as the screen-off state, the locked state, or the unlocked state. For example, a touch input may occur on a certain region (first region) of a screen.

In operation 813, the user terminal 100 may determine whether a specified sensor condition is satisfied using an illumination sensor or a grip sensor. If the specified sensor condition is not satisfied, the user terminal 100 may determine that a current situation is not appropriate for performing payment and may end the process. If the process is ended, the user terminal 100 may return to the predetermined state prior to operation 811.

If the sensor condition is satisfied in operation 813, it may be determined whether the touch input arrives at a second region, which is a reference for providing the guide information or feedback information in operation 815. If the touch input ends at the first region without arriving at the second region, the process may be ended, as illustrated by the path following the NO output at query block 815. (Note that the NO result may occur if the second region has not been arrived at within a predefined period of time following the initial user input at block 811, or, if a touch release has been sensed following the user input at 811.) If the touch input arrives at the second region, the user terminal 100 may provide a feedback indicating that a user input for running the payment application is proceeding normally.

In operation 819, the processor 110 may determine whether a position where the touch input is released (a position where touch release occurs) corresponds to a third region. For example, if the touch input ends at the third region, i.e., if a dragging (or swipe) input starting from the first region and ends at the third region occurs, the user terminal 100 may apply the above-mentioned image effect to a previously output background screen in operation 821, and may output the payment application to the background screen to which the image effect is applied in operation 823. If the user terminal 100 was in the screen-off state in operation 811, operation 821 may be skipped.

If the touch input does not end at the third region in operation 819, i.e., if the touch input ends at the second region, the user terminal 100 may output a guide item (information) for prompting execution of the payment application. If a specified input to the guide item (e.g., an input of selecting and dragging the guide item to the third region) occurs, the user terminal 100 may perform operations 821 and 823. However, if a specified time elapses without occurrence of the input to the guide item in operation 829, the process may be ended and the display 130 may return to the predetermined state.

The process of FIG. 8 is merely an example, and the order of the operations may be changed according to an embodiment of the present disclosure. For example, operation 813 may be performed between operation 821 and operation 823 so that it may be determined, immediately before the payment application is executed, whether the sensor condition is satisfied.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 110), the processor may perform functions corresponding to the instructions. The computer-readable storage medium may be, for example, the memory 120.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, even if a display of a user terminal is in a turned off state or the user terminal is in a locked state, a specific application or a specific function may be executed with ease.

Furthermore, the application or the function may be prevented from being executed by an unintentional input from a user, and a feedback indicating normal execution may be provided to the user.

The above embodiments of the present disclosure are illustrative and not limitative. Various alternatives and equivalents are possible. Other additions, subtractions, or modifications will be apparent to the skilled artisan in view of the present disclosure and are intended to fall within the scope of the appended claims.

What is claimed is:

1. An electronic device comprising:
    a sensor;
    a display, comprising a touch panel and a layer for displaying content;
    a memory storing a payment application; and
    a processor configured to:
    operate in a screen-off state, wherein power to the layer for displaying content is cut off, and power to the touch panel is maintained;
    while operating in the screen-off state, receive a swipe input spanning from a first predesignated region of the display to a second predesignated region of the display;
    in response to receiving the swipe input, execute the payment application to display, on the display, an image of a card which is registered on the payment application together with an instruction for prompting a biometric input;
    obtain, through the sensor, biometric information used for user authentication; and
    transmit, a payment signal via the payment application.

2. The electronic device of claim 1, wherein the processor is further configured to:
    display, at a side of the display, at least part of another image of another card registered on the payment application.

3. The electronic device of claim 1, wherein the processor is further configured to:
    apply a blur effect to a background screen of the display.

4. The electronic device of claim 1, further comprising a touch sensor included in the display, and
    wherein the processor is further configured to:
    while operating in the screen-off state, control the display not to output a screen, and control the touch sensor to sense the swipe input periodically.

5. The electronic device of claim 1,
wherein the biometric information comprises fingerprint information.

6. The electronic device of claim 1,
wherein the payment signal comprises a Near Field Communication (NFC) signal or a Magnetic Secure/Signal Transmission (MST) signal.

7. The electronic device of claim 1, further comprising a proximity sensor, and
wherein the processor is further configured to:
detect, through the proximity sensor, whether another object is located within a certain distance from the electronic device, and
when the another object is located within the certain distance, not execute the payment application.

8. The electronic device of claim 1, further comprising an illumination sensor, and
wherein the processor is further configured to:
detect brightness through the illumination sensor, and
wherein executing the payment application comprises executing the payment application when the brightness is higher than a specified level.

9. The electronic device of claim 1, wherein the swipe input can start from any point in the first predesignated region and end at any point in the second predesignated region.

10. An electronic device comprising:
a sensor;
a display, comprising a touch panel and a layer for displaying content;
a memory storing a payment application; and
a processor configured to:
operate in a screen-off state, wherein power to the layer for displaying content is cut off, and power to the touch panel is maintained;
while operating in the screen-off state, receive a swipe input spanning from a predesignated region of the display;
in response to receiving the swipe input, execute the payment application to display, on the display, an image of a card which is registered on the payment application together with an instruction for prompting a biometric input;
obtain, through the sensor, biometric information for user authentication; and
transmit, a payment signal via the payment application.

11. The electronic device of claim 10, wherein the processor is further configured to:
display, at a side of the display, at least part of another image of another card registered on the payment application.

12. The electronic device of claim 10, wherein the processor is further configured to:
apply a blur effect to a background screen of the display.

13. The electronic device of claim 10, further comprising a touch sensor included in the display, and
wherein the processor is further configured to:
while operating in the screen-off state, control the display not to output a screen, and
control the touch sensor to sense the swipe input periodically.

14. The electronic device of claim 10, wherein the payment signal comprises a Near Field Communication (NFC) signal or a Magnetic Secure/Signal Transmission (MST) signal.

15. The electronic device of claim 10, further comprising a proximity sensor, and
wherein the processor is further configured to:
detect, through the proximity sensor, whether another object is located within a certain distance from the electronic device, and
when the another object is located within the certain distance, not execute the payment application.

16. The electronic device of claim 10, further comprising an illumination sensor, and
wherein the processor is further configured to:
detect brightness through the illumination sensor, and
wherein execute the payment application comprises executing the payment application when the brightness is higher than a specified level.

17. A method of an electronic device, comprising:
operating in a screen-off state, wherein power to a layer of a display for displaying content is cutoff, and power to a touch panel of the display is maintained;
while operating in the screen-off state, receiving a swipe input spanning from a first predesignated region of the display of the electronic device to a second predesignated region of the display of the electronic device;
in a low power state, detecting the swipe input;
in response to detecting the swipe input, executing a payment application to display an image of a card which is registered on the payment application together with an instruction for prompting a biometric input;
obtaining, biometric information for user authentication; and
transmitting, a payment signal via the payment application.

18. The method of claim 17, further comprising:
displaying, at a side of the display, at least part of another image of another card registered on the payment application.

19. The method of claim 17, further comprising:
applying a blur effect to a background screen of the display.

20. The method of claim 17, further comprising:
detecting whether another object is located within a certain distance from the electronic device, and
when the another object is located within the certain distance, not executing the payment application.

21. The method of claim 17, further comprising:
detecting brightness through an illumination sensor, and
wherein executing the payment application comprises executing the payment application when the brightness is higher than a specified level.

* * * * *